US012564820B2

(12) United States Patent
Sollich et al.

(10) Patent No.: US 12,564,820 B2
(45) Date of Patent: Mar. 3, 2026

(54) DEVICE AND METHOD FOR GENERATING DROPLETS

(71) Applicants:Microcaps AG, Schlieren (CH); Eidgenossische Technische Hochschule Zurich (ETH), Zurich (CH)

(72) Inventors: Nicolas Sollich, Zurich (CH); Michael Hagander, Zurich (CH); Alessandro Ofner, Zurich (CH)

(73) Assignees: Microcaps AG, Schlieren (CH); Eidgenossische Technische Hochschule Zurich (ETH) Zurich, Zurich (CH)

( * ) Notice: Subject to any disclaimer, the term of this patent is extended or adjusted under 35 U.S.C. 154(b) by 984 days.

(21) Appl. No.: 17/638,285

(22) PCT Filed: Aug. 27, 2020

(86) PCT No.: PCT/EP2020/074008
§ 371 (c)(1),
(2) Date: Feb. 25, 2022

(87) PCT Pub. No.: WO2021/037999
PCT Pub. Date: Mar. 4, 2021

(65) Prior Publication Data
US 2022/0401900 A1      Dec. 22, 2022

(30) Foreign Application Priority Data

Aug. 28, 2019    (CH) ..................................... 01085/19

(51) Int. Cl.
*B01F 33/3039*          (2022.01)
*B01F 23/41*            (2022.01)
(Continued)

(52) U.S. Cl.
CPC ...... *B01F 33/3039* (2022.01); *B01F 23/4105* (2022.01); *B01F 35/92* (2022.01);
(Continued)

(58) Field of Classification Search
CPC ... B01F 33/30; B01F 33/3021; B01F 33/3039
See application file for complete search history.

(56) References Cited

U.S. PATENT DOCUMENTS

| 6,199,835 B1 | 3/2001 | Chang et al. |
| 2005/0167370 A1 | 8/2005 | Nakajima et al. |

(Continued)

FOREIGN PATENT DOCUMENTS

| EP | 1724006 A2 | 11/2006 |
| EP | 1810743 A1 | 7/2007 |

(Continued)

OTHER PUBLICATIONS

Ofner et al. "High-Throughput Step Emulsification for the Production of Functional Materials Using a Glass Microfluidic Device", Macromolecular Chemistry and Physics, 2016, vol. 218, p. 1600472: 1-10.

*Primary Examiner* — Elizabeth Insler
(74) *Attorney, Agent, or Firm* — The Webb Law Firm

(57)          ABSTRACT

A device for generating a dispersion of a first phase in a second phase includes a first inlet opening into a first chamber and being configured to supply a first phase and a second inlet opening into a second chamber and being configured to supply a second phase. A dispersion outlet is configured to collect the dispersion of the first phase in the second phase. A membrane separates the first and second chamber. The membrane includes a first side facing the first chamber and a second side facing the second chamber. Multiple channels extending from the first side to the second side of the membrane are configured to provide a fluidic connection between the first and second chamber. Each channel includes a channel inlet arranged on the first side of the membrane and a channel outlet arranged on the second side of the membrane.

41 Claims, 6 Drawing Sheets

(51) Int. Cl.
    *B01F 35/92*       (2022.01)
    *B01J 13/06*       (2006.01)
    *B01F 35/90*       (2022.01)

(52) U.S. Cl.
    CPC ........... *B01J 13/06* (2013.01); *B01F 2035/98*
               (2022.01); *B01F 2035/99* (2022.01); *B01F*
                              *2215/0422* (2013.01)

(56)             References Cited

U.S. PATENT DOCUMENTS

| | | | | |
|---|---|---|---|---|
| 2008/0061459 | A1* | 3/2008 | Nakajima ................ | C25D 1/08 |
| | | | | 425/344 |
| 2009/0023189 | A1* | 1/2009 | Lau ......................... | B01F 33/30 |
| | | | | 435/91.2 |
| 2009/0264550 | A1 | 10/2009 | Rayner | |
| 2016/0091145 | A1 | 3/2016 | Weitz et al. | |
| 2020/0023324 | A1* | 1/2020 | Studart ................... | B01F 33/30 |

FOREIGN PATENT DOCUMENTS

| | | | |
|---|---|---|---|
| EP | 3381545 | A1 | 10/2018 |
| JP | 2000446 | A | 1/2000 |
| JP | 2001520114 | A | 10/2001 |
| JP | 2005211857 | A | 8/2005 |
| JP | 2006110505 | A | 4/2006 |
| JP | 2006272085 | A | 10/2006 |
| JP | 2006320772 | A | 11/2006 |
| JP | 2008132394 | A | 6/2008 |
| JP | 2009537652 | A | 10/2009 |
| JP | 201017641 | A | 1/2010 |
| JP | 2010532706 | A | 10/2010 |
| JP | 2011104572 | A | 6/2011 |
| WO | 2014186440 | A2 | 11/2014 |
| WO | 2019104214 | A1 | 5/2019 |

* cited by examiner

DEVICE AND METHOD FOR GENERATING DROPLETS

CROSS-REFERENCE TO RELATED APPLICATIONS

This application is the United States national phase of International Application No. PCT/EP2020/074008 filed Aug. 27, 2020, and claims priority to Swiss Patent Application No. 01085/19 filed Aug. 28, 2019, the disclosures of each which are hereby incorporated by reference in their entireties.

BACKGROUND OF THE INVENTION

Field of the Invention

The invention relates to a device, a monolayer membrane and a method for generating a dispersion of a first phase in a second phase. In particular, the device is a microfluidic brush emulsifier which operates according to the principle of step emulsification, which is also referred to as microchannel emulsification.

Description of Related Art

Monodisperse droplets in the size range from micrometers to millimeters have found widespread application in the fields of pharmaceutics, cosmetics, diagnostics, food and material science. In an emulsion, monodispersity increases stability, allows to accurately control volumes in multiple chemical or biological reactions and enables the production of periodic structures. Microfluidics offers an exquisite platform to precisely form monodisperse droplets. These monodisperse droplets can be further cured for generating so-called microcapsules for encapsulation of active ingredients such as drugs, fragrances, flavors, peptides, living material, such as bacteria or phages etc, fertilizers, pesticides, and other actives for well-being.

Currently, most industrial processes for generation of microcapsules employ spray drying, high speed rotation with high shearing forces ultrasonication, mixing and/or shaking. Noteworthy, such processes generally have the disadvantage of poor size control. However, especially in selective drug delivery, accurate size control is a crucial factor.

Conventional microfluidic membranes according to the prior art are made from a bulk material as starting material. As a processing step, holes are microdrilled, lasered, wet-etched or etched by deep reactive ion etching. Those methods limit the possible sizes and shapes of the final membrane, as the channels are processed along their final flow direction. The devices of the prior art have the disadvantage that only a small percentage of the channels actively produce droplets, which significantly reduces the efficiency of emulsification. Thus, it would be desirable to increase this efficiency, in particular for large-scale industrial application of droplet generating devices.

An emulsification device consisting of a two-dimensional array of parallelized droplet makers (WO 2014/186440 A2) is known from the prior art. Such a microfluidic device in two dimensions limits high throughput production. In such a device, maximum rates of 25 mL/h can be achieved for producing monodisperse emulsions.

Hitherto known methods for producing monodisperse droplets suffer from significant limitations. Known methods either allow for the generation of droplets with accurate size control and thus reproducible quality, which are however severely limited by the overall operational capacity, or can be performed with high operational capacity, but suffer from poor reproducibility and size control. Typically, the maximum rate for the generation of a dispersion of a first phase in a second phase achieved in the prior art is $2_5$ ml/h (Ofner et al. Macromol. Chem. Phys. 2016, 218, 1600472; Amstad et al. Rapid Production of Droplets 2013, 1-70).

SUMMARY OF THE INVENTION

It is therefore a general object of the present invention to improve the state of the art regarding the generation of monodisperse droplets, thereby preferably avoiding disadvantages of the prior art at least partially.

In favorable embodiments, a process and a device for performing said process are provided, which allow achieving high operational capacity and high reproducibility, particular with respect to droplet size control.

In further favorable embodiments, a process and a device for performing said process is provided, which applies a uniform pressure to the employed first phase.

In further embodiments, a membrane is provided, which allows high operational capacity, while maintaining high reproducibility.

The overall object is achieved by the matter of the independent claims. Further favorable embodiments follow from the dependent claims, the description and the figures.

According to a first aspect, the invention is directed to a device for generating a dispersion of a first phase in a second phase, the device comprising a first inlet for supplying a first phase, which opens into a first chamber, a second inlet for supplying a second phase, opening into a second chamber and a dispersion outlet for collecting the dispersion. Furthermore, the device comprises a membrane, which separates the first chamber and the second chamber and which comprises a first side facing the first chamber and a second side facing the second chamber. The membrane comprises multiple channels extending from the first side to the second side, providing a fluidic connection between the first chamber and the second chamber. Each channel comprises a channel inlet arranged on the first side and a channel outlet arranged on the second side. The first chamber may typically be configured such that a flow rate of the first phase through all of the individual channels is essentially equal. In the state of the art, an inhomogeneous pressure distribution, in particular of the first phase, enables only a small percentage of the channels to actively produce droplets. An equal pressure distribution over the first side however, allows for a steady flow of the first phase into the second phase and for the generation of droplets with a reproducible quality with a high throughput of up to 5 liters per hour.

The membrane may typically be a monolayer membrane. Thus, such a membrane is made from a uniform material and does not contain any phase interfaces or transition areas in addition to the multiple channels of the membrane. In some embodiments, the membrane may be exchangeable. In particular, the membrane may be a membrane as described in any of the aspects and embodiments disclosed herein.

The membrane may in certain embodiments be disk-shaped. Thus, the membrane may comprise a circular contour. The multiple channels of the membrane are typically microchannels. For example, the channels may have a diameter in the range of 0.25 to 2000 μm, preferably 2 to 800 μm. Typically, the channels are arranged essentially parallel to each other.

The generated dispersion istypically a stable dispersion and/or a micro-dispersion. That is, the dispersion comprises microdroplets of the first phase in the second phase. The first and second phase are typically fluids, in particular liquids. Furthermore, the first and second phase may also be dispersions, particularly emulsions. The first phase and the second phase are typically immiscible. Thus, if the first phase is a polar phase, in particular aqueous, the second phase is apolar, in particular oil-based. Likewise, if the first phase is apolar, the second phase is polar. The first phase typically does not only contain a carrier liquid, but may also contain an active ingredient, such as a drug, peptide, antibody, DNA, RNA, fragrance, flavor, odorant, pigment, dye, bacteria, virus, phage, agrochemical ingredients, non-drug classified substances or the like. In certain embodiments, the first phase may consist of the active ingredient. The term "first phase" is typically the phase which is to be dispersed within the second phase during the process according to the invention. Therefore, the first phase may in some embodiments be referred to as "phase to be dispersed". The second phase may usually be the continuous phase into which the droplets of the first phase are dispersed.

In certain embodiments, the second chamber may be made from glass or a transparent polymer, such as PTFE, polymethyl(meth)acrylate or polyoxymethylene, or from metals such as steel, aluminum or titanium. In general, the device may comprise a container, such as a glass container, which partially forms the second chamber. Together with the membrane, the container may form the second chamber. In some embodiments, the first chamber may be made from metal, for example aluminum or steel or from a transparent polymer, such as PTFE, polymethyl(meth)acrylate or polyoxymethylene.

Typically, the dispersion outlet may be connected to a product vessel. The dispersion outlet may in some embodiments be in fluid communication with three-way valve, which is switchable between a product vessel and a waste vessel.

In some embodiments, the first chamber is configured such that in an operative state, the pressure along the first side of the membrane is essentially isobaric. For example, the first inlet may comprise a nozzle for providing an isobaric pressure distribution over the first side of the membrane. In particular, a spray nozzle may be used. Alternatively, the first chamber may be shaped such that an isobaric pressure distribution over the first side of the membrane is provided.

In further embodiments, the first chamber has a rounded cross-section with respect to a cross-sectional plane, which is perpendicular to the membrane and rotationally symmetric with respect to a central longitudinal axis. The term "rounded cross-section" as used herein refers to a continuous curve without into crements, particularly to a curve which has in the cross-sectional plane being perpendicular to the membrane, a radius of at least 1 mm, particularly at least 5 mm, particularly at least 10 mm. It is understood that the curvature in the cross-sectional view can be described as a part of a circle with said radius. Thus, the sidewalls of the first chamber may continuously converge towards each other in the upstream direction. The central longitudinal axis is an axis extending in the longitudinal direction of the device, which is arranged in the center of the device and/or to an axis being perpendicular to the membrane and intersecting the center of the membrane. For example, the first chamber may have a U-shaped cross-section or may be concavely rounded or semi-circular. The rounded cross-section is typically edgeless and thus excludes edges, which would lead to an uneven pressure distribution when the first phase is forced through the membrane. Preferably, the first chamber may have the shape of a spherical dome. The shape of the first chamber may in general preferably be essentially rotationally symmetric to the central longitudinal axis.

In certain embodiments, the dispersion outlet may essentially be arranged on the central longitudinal axis and/or the axis being perpendicular to the membrane and intersecting the center of the membrane. Preferably, the second chamber is tapered towards the dispersion outlet. For example, at least parts of the second chamber may be arch- or cone-shaped towards the dispersion outlet. These embodiments ensure that no droplets are entrapped and all are directly collectable via the dispersion outlet.

In some embodiments, the first chamber has the shape of a hemisphere or of a truncated cone. Typically, the hemisphere or the truncated cone opens towards the membrane, that is, the largest radius is typically closest to the membrane. The term "hemispherical" as used herein also comprises other spherical segments, such as a third of a sphere. Thus, in some embodiments the shape of the first chamber is a spherical dome or spherical cap. Preferably, if the first chamber has a shape of a spherical dome, and/or particularly a hemispherical shape, the first inlet may be arranged adjacent to or in the region of a pole of the spherical dome of the first chamber, particularly of the hemispherical shaped first chamber. Such shapes have the advantage that the material flow of the first phase is equally distributed over the first side of the membrane, thereby helping to provide an equal pressure distribution adjacent to individual channel. The first inlet may for example be arranged essentially perpendicular to the central longitudinal axis, i.e. essentially parallel to the first side of the membrane, or also parallel to the central longitudinal axis, i.e. perpendicular with respect to the first side of the membrane.

In further embodiments, the second side of the membrane comprises a total open area that is larger than the total open area of the first side. Such a membrane has the advantage that high quality droplets are generated, even at flow rates of up to 5 l/h. In some embodiments, the flow rate per channel may be between 1 μl/h to 50 ml/h, preferably 10 μL/h to 5 ml/h.

In certain embodiments each channel comprises a channel outlet with a cross-sectional area which is larger than the cross-sectional area of the remaining part of the respective channel. In the longitudinal direction, i.e. in the direction of flow, the channel outlet has a typical length of several micrometers, for example 200 μm to 20 mm, preferably 500 μm to 5 mm. The channel outlet may for example be funnel shaped, V-shaped or U-shaped. In some embodiments, the channel outlet may have an elliptical contour. In particular, the channel outlet is not rotational symmetric, thus having a ratio of length/width of 3 and higher. Hence, the channel outlet may not have a circular or square shaped cross-section. Such a channel outlet enables the detachment of a droplet without external force. As a result, droplet formation of the first phase in the second phase is decoupled and thus essentially independent from the flow rate. According to the Young-Laplace equation, the pressure at an immiscible liquid interface is higher at the channel outlets than in the second reservoir. Thus a pressure gradient along the direction of the flow is generated, which causes the detachment of the fluid thread into individual droplets. Thus a pressure gradient is generated at the end of the channel, which facilitates the detachment of the fluids boundary layer and thus the formation of the individual droplets. When reaching the channel outlet, the pressure gradient of the disperse phase in and outside of the channel a droplet detaches without external force. Such a nozzle is advantageous, as it decouples the flow rates from the emulsification process.

In some embodiments, the first inlet is arranged in an angle of essentially 90° or less with respect to the channels of the membrane. Typically, all channels are arranged essentially in parallel to each other. This has the beneficial effect that the first phase is not directly forced onto the membrane, thereby further enabling to provide a uniform pressure distribution over each channel of the membrane. For example, the angle between the first inlet and the channels of the membrane may be between 60° and 90°, particularly 75° and 90°. Preferably, the first inlet is essentially transversely, preferably perpendicularly, art ranged to the multiple channels of the membrane. Thus, in such embodiments, the first inlet may be parallel to the first side of the membrane.

In further embodiments the device comprises a membrane holder for mounting the membrane.

In certain embodiments, the device comprises a container holder for holding the container, which partially forms the second chamber. The container holder may be fixedly and releasably connected to the membrane holder. The container holder and/or the membrane holder and/or the basis may be made from any suitable material such as a plastic material, such as PTFE, polymethyl(meth)acrylate or polyoxymethylene or a metal, preferably steel.

Preferably, if the container is a glass container, a damping pad may be arranged between the glass container and the container holder for avoiding damaging and sealing the glass container.

In some embodiments the membrane holder comprises a clamp device for mounting the membrane, the membrane holder and/or the clamp device being configured to accommodate membranes having various thicknesses. Typically, the clamp device may be adjustable. Examples for the clamp device include screws, clamps, bolts, locks, etc.

In some embodiments, the device comprises a base, and preferably the first chamber is partially formed by the base.

In further embodiments the base and/or the membrane holder comprises at least one sealing to seal the membrane against the base and/or against the membrane holder. The sealing ring may be configured such that it circumferentially fully surrounds the periphery of the membrane. The sealing ring may also comprise a gas outlet in fluidic communication with the first chamber and being configured to vent any gas present in the first chamber out of the first chamber.

In some embodiments, the base and/or the membrane holder comprises a spacer ring. Such a spacer ring allows for employing differently thick membranes.

In some embodiments the first chamber comprises a gas outlet, particularly a fluidic switch such as e.g. a valve. The gas outlet and the membrane are arranged such that gas within the first chamber is during supplying the first phase to the first chamber, in particular during the first/initial filling of the first chamber with the first phase, directed towards the gas outlet and removed from the first chamber via the gas outlet. In some examples, the membrane is inclined with respect to the central longitudinal axis of the device. Thus, the angle in a cross sectional view along the central longitudinal axis between the central longitudinal axis and the first and/or second side of the membrane is different from 90°. For example, the acute angle between the second side of the membrane and the central longitudinal axis may be between 45° and 89°, preferably between 70° and 88°, more preferably between 78° and 87°. In such embodiments, the gas outlet may be arranged at the top edge of the first chamber, which is formed by the membrane and another chamber wall. This ensure that any residual gas, in particular air, being present in the first chamber, for example prior to using the device, rises to the membrane and due to the inclined arrangement of the membrane is directed to the top edge and thus to the gas outlet. Normally, the channels of the membrane are too narrow for air to pass through and therefore a gas outlet as described in the embodiments above enables to remove all remaining gas, which otherwise would negatively influence uniform droplet size and distribution or block the first fluid from reaching all the microchannels, hence decreasing the throughput. Typically, the gas outlet may be in fluid communication with the environment of the device.

In some embodiments the device comprises at least one heater to heat the first phase and/or the second phase and/or at least one cooler to cool the first phase and/or the second phase. It may be beneficial to heat or cool either of the phases, as curing of the generated dispersed droplets may be readily effected by a temperature changes, for example by allowing the dispersion to cool. Typically, the at least one heater may provide enough thermal energy to heat the first phase and/or the second phase up to 100° C., up to 125° C., or up to 150° C. The heater may for example comprise a heating bath, such as a water bath or an oil bath. Alternatively, the heater may be an IR-radiator, a heating coil, or any other suitable heater.

In further embodiments the device comprises a first reservoir for the first phase and/or a second reservoir for the second phase, and the flow rate through the membrane is adjustable. Both the first and second reservoir may be pressurized. For example, the reservoirs may be fluidic connected to a pressure source, such as a compressor. Alternatively, the reservoirs may be syringes and pressurized by a common syringe pump and/or a plunger or a peristaltic pump, gear pump or any other pumping system.

The dispersion outlet may for example be in fluid connection with a product vessel and/or a waste vessel. Alternatively, or additionally, a post-processing vessel may be arranged between the second reservoir and the product or waste vessel. In some embodiments, the second reservoir may further serve as a post-processing vessel.

In some embodiments, a flow restrictor is arranged between the second reservoir for the second phase and the second chamber. Such a restrictor is beneficial, as the second chamber typically does not provide a significant flow resistance for the second phase. Thus, by using a flow restrictor, the device is more stable, as unintentional pressure differences, for example by fluctuating air pressure, can be avoided.

In further embodiments, the second inlet comprises a supply channel being at least partially circumferentially arranged around the central longitudinal axis, respectively the axis being perpendicular to the first and second side of the membrane and intersecting the center of the membrane. The supply channel comprises one or more openings into the second chamber. At least partially circumferentially arranged around the above mentioned axis means that the supply channel may have the contour of, a partial circle, such as a semi-circle or a third of a circle, etc. Preferably, the supply channel is fully circumferentially arranged around the central longitudinal axis, respectively the axis being perpendicular to the membrane and intersecting the center of the membrane. In such embodiments, the supply channel forms a ring-like structure. Preferably, the supply channel comprises multiple openings into the second chamber, which in particular are essentially uniformly distributed along the circumference of the supply channel. Typically, the one or more openings of the supply channel may be arranged in the direction of the dispersion outlet, i.e. such that the openings are facing the dispersion outlet. Embodiments comprising a supply channel have the advantage that the second phase can be uniformly and smoothly introduced into the second chamber without causing detrimental turbulences which negatively influence the uniform shape and size distribution of the generated microdroplets. In some embodiments, the one or more openings of the supply channel are arranged such that a vortex is generated when the second phase is provided into the second chamber. Particularly, the one or more openings may be tubular and the longitudinal axis of each tubular opening can be inclined with respect to the central longitudinal axis of the device. Typically, all tubular openings are uniformly inclined. The generation of a vortex is beneficial as firstly, a surface stabilizer which may generally be comprised in the first and/or the second phase may be more evenly distributed, which will thus enhance the stability of the formed dispersion and secondly, because the transport of the generated dispersion towards the dispersion outlet is accelerated, which is particularly beneficial if the density of the first and second phase is essentially equal.

Typically, the supply channel is arranged at the bottom of the second chamber, i.e. adjacent to the membrane. The supply channel may for example also be arranged circumferentially around the membrane. The supply channel may have a diameter of 2 mm to 100 mm, preferably 5 mm to 20 mm.

Alternatively, the second inlet may constitute a single inlet opening directly into the second chamber, preferably from a lateral side of the second chamber.

In some embodiments, the device may contain a control unit. Typically, the control unit may be circuit, a microprocessor or the like.

In some embodiments, the device may contain a storage unit configured for storing data. The storage unit may be a microprocessor, a hard drive or an interface to a cloud based system. This storage unit is not part of the membrane.

In some embodiments, the device may comprise an input panel, such as a keyboard, a touch screen and the like for data input by a user. The device may also comprise an information system, such as a display, screen, and the like for presenting data to a user.

In further embodiments, the membrane contains a tag, preferably a computer-readable tag. The tag may be a 2D or a 1D tag, a barcode, a hologram, a RFID tag or a chip. The device may further comprise a read-out unit configured for retrieving data from the tag and a control unit configured for processing the data from the tag. The data may be associated with desired quality values for the generated monodispersed droplets, such as particle size and size distribution as well as lower and upper thresholds thereof, which can be retrieved via the read-out unit. Furthermore, the data can be associated with process parameters, such as pressure to be applied to the first and/or second chamber, flow rate or pressure of the first and/or second phase, temperature of the first and/or second phase, materials used, measured quality values, particularly by an analysis unit, viscosity of the first and/or second phase, interfacial tensions, contact angles, duration of droplet production, etc. The data can also be associated with parameters of the membrane itself, i.e. channel outlet shape, channel size, such as diameter, aspect ratio, length, as well as membrane thickness and/or diameter, surface functionality, such as hydrophobic or hydrophilic treatments, material of the membrane, for example steel glass or polymer, date of use, etc.

The read-out unit and the control unit are not part of the membrane. The read-out unit may for example be an optical scanner, a camera or the like. Processing data by the control unit may for example comprise retrieving particular data associated with process parameters, such as pressure to be applied to the first and/or second chamber, flow rate of the first and/or second phase, temperature of the first and/or second phase, etc. and adjusting these parameters, in particular automatically, when the device is operated. This allows to store optimal parameters for each specific membrane or membrane type. Depending on specific membrane characteristics, such as thickness, total open area, channel outlet shape, etc., certain process parameters should ideally be optimized. Instead of optimizing each membrane individually, optimized parameters for each membrane type can be used. These optimized parameters can be stored as data via the tag directly on the specific membrane or can alternatively be stored within the device itself, i.e. in the storage unit. In the latter case, the tag of the membrane is associated with a specific code being associated with a specific set of data, such as process data or desired quality values, stored in the storage unit. A user then only has to insert the membrane into the device and the read-out unit may retrieve the data from the tag, transmit the data to the control unit, which then may adjust the corresponding process parameters based on the data retrieved either directly from the membrane or by retrieving a specific set of process parameters being associated with the specific code on the membrane and stored in the storage unit. The read-out unit may either be positioned such that the tag can be read out when the membrane is inserted into the membrane holder, i.e. when it is positioned between the first and second chamber. Alternatively, the read-out unit may be positioned at any suitable position of the device. The user can then scan the tag of the membrane before introducing it into the membrane holder. The read-out unit may also be portable, such as a portable scanner.

In some embodiments, the device further comprises a transmitter unit configured for transmitting data, particularly process data, such as actually applied process parameters, for example pressure applied to the first and/or second chamber, flow rate of the first and/or second phase, temperature of the first and/or second phase, etc. to a receiver. The process data as described herein may also comprise log-book entries, i.e. information about duration of use, location of use, a user ID, etc. Transmission may occur by any method known to the skilled person, for example via Bluetooth®, WiFi, Ethernet, online transmission, etc. The transmission might for example occur in real time, i.e. the process parameters are directly transmitted while the device is in use.

The control unit may in some embodiments comprise a storage unit, in particular a hard drive or an interface to a cloud based system, for recording and storing actual process data in real time. The control unit may for example be configured to retrieve the process data stored in the storage unit on demand or at regular time intervals. Optionally, the data may then be provided to the transmitter unit which then transmits the data to a receiver. As an alternative to transmitting data in real time to the receiver, the data may be stored in the storage unit and retrieved and transmitted by the transmitter unit at regular time intervals or on demand.

In some embodiments, the receiver may be a membrane storage unit comprised in the membrane. In such embodiments, the transmitter unit may transmit actually employed process parameters to the membrane storage unit.

In some embodiments, the device may comprise an analysis unit with a sensor, preferably an optical sensor, configured for determining and controlling quality values, such as the size and size distribution of the generated monodisperse droplets. The optical sensor may for example be configured for measuring and/or determining diffraction of light, i.e. determine the refractive index of the product to be analyzed.

In preferred embodiments, the analysis unit may comprise a detection chamber configured for enabling determining the quality values of the generated dispersion. The detection chamber may preferably be configured for hosting only a single layer of the generated monodisperse droplets or also single mono-disperse droplets. For example, the detection chamber may comprise or consist of a transparent material. The detection chamber may be configured such that the hosted generated monodisperse droplets are maintained in a steady state or a non-steady state during analysis. It is also possible that the detection chamber is a microchannel which has a diameter that is typically larger than the diameter of the generated monodisperse droplets. For example, the diameter may be less than 5000 μm, or less than 2000 μm, or less than or less than 1000 μm, or less than 500 μm. In such embodiments, the generated monodisperse droplets can be analyzed by the sensor while they are within the microchannel. It is understood that the sensor is generally arranged and positioned such that droplets can be analyzed.

The analysis unit is arranged downstream of the membrane. For example, the analysis unit may be in fluidic communication with a channel branching off the second chamber, or the analysis unit may be arranged downstream of the dispersion outlet. Downstream of the dispersion outlet, the device may comprise a fluidic junction, which particularly might be controlled by a switch, which is in fluid communication with the analysis unit. For example, the control unit may be configured such that the switch is automatically or on demand operated in a way that a limited number of generated monodisperse droplets is directed towards and into the analysis unit, particularly while the device is operating. Thus, the analysis unit allows an in-line quality control directly while the monodisperse droplets are generated.

It is understood that typically the control unit, the transmitting unit, the storage unit, the read-out unit and the analysis unit are operatively coupled with each other.

In some embodiments, the analysis unit is operatively coupled to the control unit, the transmitting unit and/or the storage unit. Thus, obtained quality values, such as particle size and size distribution of the generated monodisperse droplets, can be stored in the storage unit, transmitted or directly retrieved by the membrane as described above.

In some embodiments in which the device comprises a transmitter unit as described above, the transmitter unit may be configured for transmitting the quality parameters to the receiver. The quality parameters may be transmitted in real time or on demand, respectively at regular time intervals.

The control unit may in some embodiments be configured to monitor the quality parameters and detect if a quality parameter falls below or exceeds a predefined upper and or lower threshold value. The threshold values associated with data may be retrieved from the membrane, i.e. they may be stored directly via the tag on the membrane or the tag contains a specific code which is associated with specific upper and lower thresholds stored in the storage unit, such as an upper and lower droplet size. In such embodiments an alarm may be triggered, when a quality parameter falls below or exceeds the predefined upper and or lower threshold. The alarm may for example be an acoustic signal, a visual signal and/or a haptic signal. Additionally, or alternatively, the control unit may switch off the device, i.e. disable the provision of additional first and/or second phase, if a quality parameter falls below or exceeds a predefined threshold value.

In a second aspect, the invention comprises a membrane for generating a dispersion of a first phase in a second phase, comprising a first side and opposite thereto a second side, and multiple channels extending from the first side to the second side through the membrane. Each channel comprises a channel inlet arranged at the first side, a channel outlet arranged at the second side and a main section being arranged between the channel inlet and channel outlet, wherein the channel outlet comprises a shape deviating from the shape of the main section.

In some typical embodiments, the shape of the channel outlet is non-symmetrical. For example, the shape of the channel outlet may have a rectangular or ellipsoid cross-section with respect to a cross sectional plane being perpendicular to the direction of flow through the channel.

Typically, the main section is defined as the whole section between the channel inlet and channel outlet. The main section typically has a constant diameter over the full length of the main section.

In some embodiments, the second side of the membrane comprises a total open area that is larger than the total open area of the first side.

Preferably, a cross-sectional area of the channel outlet is larger than the cross-sectional area of the rest of the channel.

A membrane as described in any of the embodiments of the second aspect of the invention may in general be used in a device as described herein.

The membrane may typically be a monolayer membrane. That is, the membrane is made from a single piece. Preferably, such a membrane is made from a massive material and does not contain any phase interfaces or transition areas in addition to the multiple channels of the membrane. Such a membrane is advantageous for the quality of the generated droplets, as any phase interfaces and transitions are detrimental to droplet formation and droplet stability.

In some embodiments, the membrane may be exchangeable. The multiple channels of the membrane are typically micro-channels. For example, each channel may have a cross-sectional area of 0.04 μm$^2$ to 4000 000 μm$^2$, preferably 4 μm$^2$ to 640 000 μm$^2$ at any position of the channel except for the cross-section at the channel outlet (main section and/or channel inlet), while the cross-sectional area at the channel outlet may be larger.

In further embodiments, the channel outlet may be wedge-shaped. In particular, the channel outlet may comprise an elliptical cross-section with respect to a transversal plane being perpendicular to the extending channel, i.e. the channel outlet may be larger in a first direction than in a second direction.

Typically, each channel is defined by channel walls. The channel walls may be curved, i.e. the channel walls may be convexly or concavely shaped towards the channel outlet. Furthermore, each channel may comprise a constriction with a cross-section which is smaller than the cross-section of the rest of the channel and wherein the constriction is arranged adjacent the channel outlet. Thus, the constriction is arranged between the channel outlet and the rest of the channel.

In certain embodiments, each channel outlet may have an elliptical contour. Thus, the channel outlet may have an elliptical cross-section with respect to a plane being transversal to the extending channel and being parallel to the first or second side of the membrane. Channel outlets with an elliptical contour have a beneficial effect on the quality of the formed droplets, as any edges within the channel may lead to unstable and in homogeneous droplets.

In some embodiments, the membrane is disk-shaped. Such a membrane may have a circular contour. Alternatively, the membrane may have an angular, particularly a triangular or rectangular, contour.

In certain embodiments, the membrane comprises 1 to 10 000 000, preferably 20 to 500 000 channels.

In further embodiments, the membrane comprises o.o6 to 600 000 channels/cm$^2$, preferably 20 to 30 000 channels/cm$^2$.

In some embodiments, the membrane is made of glass or a polymeric material, such as polymethyl(meth)acrylate or PTFE or of a metallic material, such as steel.

In further embodiments, the membrane is generated by 3D printing, particularly additive manufacturing or subtractive manufacturing. The membrane can be generated by 3D lasering of the channel structures followed by wet etching in acid, such as hydrofluoric acid or base, such as potassium hydroxide. In cases where steel or plastic membranes are used, the membranes can be generated by micromachining, with methods such as drilling, milling, lathing or laser melting, eroding etc.

In some embodiments, the cross-sectional area of the rest of each channel, in particular the main section, is in the range of 0.125 μm$^2$to 4 mm$^2$ preferably 10 μm$^2$to 0.5 mm$^2$.

In further embodiments, the cross-sectional area of each channel outlet is 0.12 to 36 000 000 μm$^2$, preferably 12 to 5 760 000 μm$^2$. In particular, total open area of the second side of the membrane may be 300% to 1500%, preferably 400% to 900%, larger than total open area of the channels at any other given position, such as the main section and/or the channel inlets.

In further embodiments, the aspect ratio of each channel, which is defined as channel length/minimum diameter, 5 to 1000, particularly, 10 to 500, more particularly 10 to 50.

In certain embodiments, each channel of the membrane has a rounded cross-section with respect to a transversal plane. That is, each channel is essentially edgeless, at least within the channel and/or the channel outlet. Such channels are beneficial, as edges may have a detrimental effect on pressure distribution, flow characteristics and reproducibility of the generated dispersed droplets. The transversal plane is coplanar to the membrane and to the first and second side of the membrane. Typically, both the channel outlet as well as the rest of the channel may have a rounded cross-section.

In further embodiments, the membrane has a thickness of 0.05 mm to 20 mm, particularly between 0.1 mm to 20 mm, particularly 0.1 mm to 5 mm, particularly 0.5 to 20 mm. Typically, the thickness of the membrane is equal to the total length of each channel. The total length of each channel is the sum of the length of each channel outlet and the length of the rest of the channel.

In some embodiments the membrane comprises at least one solid support structure without channels dividing the membrane in two or more channel containing sections. The solid support structure increases the stability of the membrane. Such a solid support structure can be integral with membrane or can constitute additional elements, which are arranged on top of the first and/or second surface of the membrane. If several solid support structures are present, these may extend in parallel to the first and/or second side of the membrane, i.e. transversal to the extending channels.

The solid support structure may be a straight beam. Typically, the support structure is devoid of channels. Usually only a minority of the total surface area of the first and/or second side of the membrane is part of the support structures. The total surface area of the at least one support structure (or of all support structures combined) compared to the total surface of the channel containing sections may be smaller than 1:10, preferably smaller than 1:15, in particular smaller than 1:20. Support structures may be arranged such that some of the channel containing sections each have a triangular shape, preferably at least 6, particularly at least 10. The solid support structures reinforce the membrane, facilitate membrane handling and avoid breaking, as the membrane might become relatively fragile due to the large total open area of the channels. In further embodiments, the membrane contains a tag, preferably a computer-readable tag. The tag may be a 2D or a 1D tag, a barcode, a hologram, a RFID tag or a chip. The tag may be computer-readable. Preferably the tag contains data which may be associated with desired quality values for the generated monodispersed droplets, such as particle size and size distribution as well as lower and upper thresholds thereof, which can be retrieved via the read-out unit. Furthermore, the data can be associated with process parameters, such as pressure to be applied to the first and/or second chamber, flow rate of the first and/or second phase, temperature of the first and/or second phase, materials used, etc. The data can also be associated with parameters of the membrane itself, i.e. channel outlet shape, channel size, such as diameter, aspect ratio, length, as well as membrane thickness. The data may either be stored directly within the tag or the tag may comprise a specific code which is associated with specific data being stored in device, in particular in a device as described in any of the aspects and embodiments herein, in combination with which the membrane is used.

In some embodiments, the membrane may comprise a membrane storage unit configured to receive and store data transmitted by a transmitter device. The membrane storage unit may be an electronic circuit, a microprocessor or the like, Thus, the membrane may store actually employed process parameters obtained from the device, particularly from the transmitter device. Thus, the membrane can be returned to the manufacturer, who can retrieve the process parameters and analyze them.

In certain embodiments, the membrane may comprise a membrane sealing ring, which circumferentially fully surrounds the periphery of the membrane. Such a membrane sealing ring may have a C-shaped cross-section, which on the one hand fully enables to completely surround the periphery of the membrane, but also minor parts of the first and second side of the membrane. The membrane sealing ring may preferably be made from a suitable polymeric material, such as rubber, silicone and the like.

According to another aspect, the invention comprises a method for generating a dispersion of a first phase in a second phase using a device according to any of the embodiments described herein. The method comprises the steps of providing a device as described in any of the embodiments disclosed herein, supplying a first phase through the first inlet into the first chamber and supplying a second phase through the second inlet into the second chamber, wherein the first phase flows from the first chamber through the multiple channels of the membrane into the second chamber to form a dispersion of the first phase in the second phase.

Typically, a pressure may be applied to the first phase in the first chamber. For example, the pressure may be applied via pressurized first reservoir of the device and/or via an external gas pressure supply line. Optionally, pressure may also be applied to the second phase in the second chamber.

In some embodiments, the dispersion generated in the second chamber is collected via a dispersion outlet. Preferably, the dispersion is continuously collected during generation of the dispersion in the second chamber.

In some embodiments, the first and/or the second phase may comprise a surface stabilizer for stabilizing the generated dispersion of the first phase in the second phase. Preferably the surface stabilizer is comprised only in the second phase. For example, the surface stabilizer may be a surfactant, such as an anionic, cationic or amphoteric surfactant. The surface stabilizer may also be soap or a suitable protein. Additionally, or alternatively, the surface stabilizer may be a solid particle, depending on the application preferably a hydrophobic hydrophilic or Janus-type particle, configured for providing a pickering emulsion. For example, the solid particle may be colloidal silica. In some embodiments, the amount of surface stabilizer in the first and/or the second phase is above the critical micelle concentration, particularly between 0.001 to 5 wt %, particularly between 0.01 to 5 wt %, particularly between 0.1 and 5 wt %.

In some embodiments, the pressure along the first side of the membrane is essentially isobaric. Thus, the pressure at each of the multiple channels may essentially be uniform.

In further embodiments, the mass flow of the first phase through the individual channels is essentially equal over the membrane. Thus, the throughput through each of the individual channels is essentially equal.

In some embodiments, an overpressure of up to 10 atm. is applied to the first phase in the first chamber. Preferably, the absolute pressure applied to the first phase may be up to 11 atm.

In further embodiments, the pressure of the second phase in the second chamber is 0.01 to 10 atm., preferably 0.01 to 1 atm.

In some embodiments, the pressure of the second phase is reduced by a flow restrictor prior to supplying the second phase into the second chamber.

In some embodiments a read-out unit retrieves data from a tag on the membrane and the retrieved data is provided to a control unit which processes the data. Typically, read-out may be performed, before the first and/or the second phase is supplied. The data may be associated with desired quality values for the generated monodispersed droplets, such as particle size and size distribution as well as lower and upper thresholds thereof, which can be retrieved via the read-out unit. Furthermore, the data can be associated with process parameters, such as pressure to be applied to the first and/or second chamber, flow rate of the first and/or second phase, temperature of the first and/or second phase, materials used, etc. The data can also be associated with parameters of the membrane itself, i.e. channel outlet shape, channel size, such as diameter, aspect ratio, length, as well as membrane thickness. Processing data by the control unit may for example comprise retrieving particular data associated with process parameters, such as pressure to be applied to the first and/or second chamber, flow rate of the first and/or second phase, temperature of the first and/or second phase, etc. and adjusting these parameters, in particular automatically, when the device is operated. Depending on specific membrane characteristics, such as thickness, total open area, channel outlet shape, etc., certain process parameters should ideally be optimized. Instead of optimizing each membrane individually, optimized parameters for each membrane type can be used. These optimized parameters can be stored as data via the tag directly on the specific membrane or alternatively be stored within the device itself, i.e. in the storage unit. In the latter case, the tag of the membrane is associated with a specific code being associated with a specific set of data, such as process data or desired quality values, stored in the storage unit. A user then only has to insert the membrane into the device and the read-out unit may retrieve the data from the tag, transmit the data to the control unit, which then may adjust the corresponding process parameters based on the data retrieved either directly from the membrane or by retrieving a specific set of process parameters being associated with the specific code on the membrane and stored in the storage unit.

In some embodiments data is transmitted by a transmitting unit to a receiver. The data may be actual process data, such as actually applied process parameters, for example pressure applied to the first and/or second chamber, flow rate of the first and/or second phase, temperature of the first and/or second phase, etc. The process data as described herein may also comprise log-book entries, i.e. information about duration of use, location of use, a user ID, etc. Transmission may occur by any method known to the skilled person, for example via Bluetooth®, WiFi, Ethernet, online transmission, etc. The transmission might for example occur in real time, i.e. the process parameters are directly transmitted while the device is in use, i.e. while the first phase and/or the second phase are supplied.

Alternatively, actual process data may be recorded and stored in a storage unit. A control unit may for example retrieve the stored process data on demand or at regular time intervals. Optionally, the data may then be provided to the transmitter unit which then transmits the data to a receiver. As an alternative to transmitting data in real time to the receiver, the data may be stored in the storage unit and retrieved and transmitted by the transmitter unit at regular time intervals or on demand.

In some embodiments, the receiver may be a membrane storage unit comprised in the membrane. In such embodiments, the transmitter unit may transmit actually employed process parameters to the membrane storage unit.

In some embodiments the generated dispersion comprises monodispersed droplets and at least one of the generated monodispersed droplets is analyzed in an analysis unit with a sensor. The analysis may be performed in line, i.e. during supplying the first phase and/or the second phase, as well as after ceasing supplying the first and/or the second phase. Furthermore, the analysis may comprise determining and controlling quality values, such as the size and size distribution of the generated monodisperse droplets. The optical sensor may for example be configured for measuring and/or determining diffraction of light, i.e. determine the refractive index of the product to be analyzed.

In preferred embodiments, the analysis unit may comprise a detection chamber, which may be configured to enable determining the quality values of the generated dispersion. The detection chamber may preferably host only a single layer of the generated monodisperse droplets or also single monodisperse droplets. For example, the detection chamber may comprise or consist of a transparent material. The detection chamber may host generated monodisperse droplets in a steady state or a non-steady state during analysis. It is also possible that the detection chamber is a microchannel which has a diameter that is typically larger than the diameter of the generated monodisperse droplets. For example, the diameter may be less than 5000 μm, or less than 2000 μm, or less than or less than 1000 μm, or less than 500 μm. In such embodiments, the generated monodisperse droplets can be analyzed by the sensor while they are within the microchannel. It is understood that the sensor is generally arranged and positioned such that droplets can be analyzed.

In some embodiments, the analysis unit is operatively coupled to the control unit, and/or the storage unit. Thus, obtained quality values, such as particle size and size distribution of the generated monodisperse droplets, can be stored in the storage unit, or directly retrieved by the membrane as described above In further embodiments, the transmitter unit can transmit the quality parameters to the receiver. The quality parameters may be transmitted in real time or on demand, respectively at regular time intervals.

In some embodiments, the quality parameters are monitored by a control unit. If it is detected that quality parameter falls below or exceeds a predefined upper and or lower threshold value, an alarm may be triggered and/or supplying the first and/or second phase immediately ceases. The alarm may for example be an acoustic signal, a visual signal and/or a haptic signal.

The generated dispersion of the first phase in the second phase can be further processed to generate capsules and particles, such as microcapsules, micro-particles, nano-capsules, nano-particles. Typical methods include thermal curing, either by heating or cooling, chemically, UV, or thermally induced polymerization, solvent extraction, chemical reactions, interfacial reactions, gelations, cross-linking, irradiation, complex coacervation and other methods known to the skilled person. A microcapsule or microparticle may haven average diameter of 1 to 1000 $\mu$m, a nano-particle or nano-capsule may haven average diameter of 1 nm to less than 1 $\mu$m. However, it is possible to also generate particles and capsules with an average diameter being larger than 1000 $\mu$m, with an average diameter of up to 5 mm, or up to 3 mm.

According to a further aspect, the invention is directed to a system for generating a dispersion with multiple core droplets comprising at least two devices, each according to any of the embodiments described herein, which are connected in series. Thus, a first dispersion with a first set of dispersed droplets is formed in the first device, which is then provided to the first chamber of the second device, which is in flow direction arranged after the first device. The first set of dispersed droplets flows through the channels of the membrane of the second device and thus forms multiple core droplets in the second phase. As the skilled person understands, a multiple core droplet is a droplet comprising an inner core and additional layers surrounding the inner core. The inner core and each of the single layers may be made of different materials. However, it is also possible that at least some of the layers and/or the inner core are made of the same material if separated by at least one different material. Additionally or alternatively, multiple emulsions can be formed by adding an emulsion to a device according to any of the embodiments described herein, particular to the first and/or second phase, by methods known to the skilled person, such as shaking, ultrasonicating, high-shear emulsification, spray drying.

According to another aspect, the invention is directed to a device for generating a dispersion of a first phase in a second phase, comprising a first inlet for supplying a first phase, opening into a first chamber;

a second inlet for supplying a second phase, opening into a second chamber; a dispersion outlet for collecting the dispersion of the first phase in the second phase; a membrane holder for holding a membrane which can separate the first chamber and the second chamber, wherein the first chamber has a rounded cross-section with respect to a cross-sectional plane, rotationally symmetric with respect to a central longitudinal axis intersecting the center of the first chamber and the center of the second chamber. This aspect of the invention can also be combined with one or more of the embodiments described herein, in particular with one or more of the embodiments described with respect to the first aspect of the invention. The device can ins some embodiments also comprise a membrane as described in any of the aspects and embodiments described herein being arranged such that it separates the first chamber and the second chamber and comprising a first side facing the first chamber and a second side facing the second chamber. The membrane can further be held by the membrane holder.

BRIEF DESCRIPTION OF THE DRAWINGS

The herein described invention will be more fully understood from the detailed description given herein below and the accompanying drawings which should not be considered limiting to the invention described in the appended claims. The drawings show:

DETAILED DESCRIPTION

Figure 1:
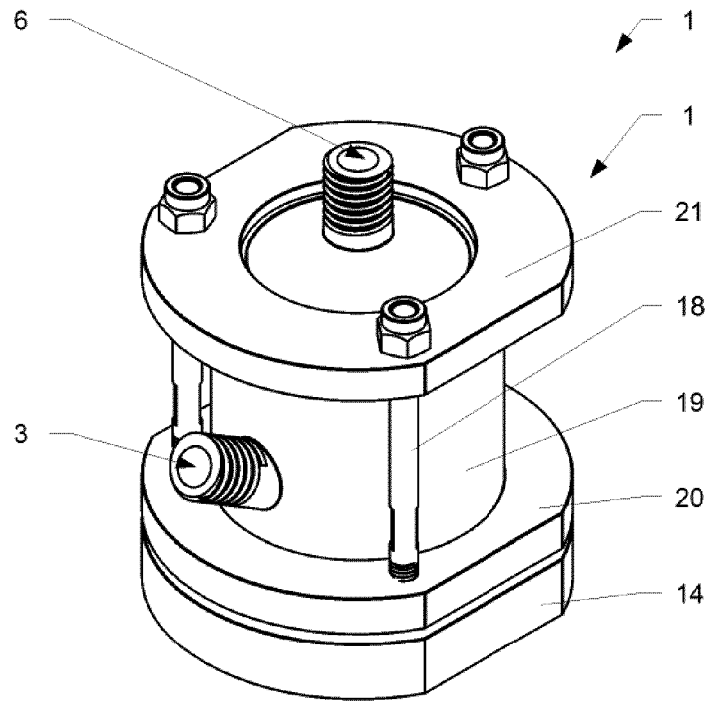
FIG. 1 a schematic view of a device for generating a dispersion of a first phase in a second phase according to a first embodiment of the invention.

FIG. 1 depicts device 1 for generating a dispersion of a first phase in a second phase. Device 1 comprises a container 19, which is made from glass and base 14 being made from metal. Base 14 comprises a first inlet (not shown, see FIG. 2) for supplying a first phase, opening into a first chamber. The first chamber is partly formed by base 14 and membrane 7 (see FIG. 2). Container 19 comprises second inlet 3 for supplying a second phase, opening into a second chamber and dispersion outlet 6 for collecting the dispersion generated within the second chamber. The second chamber is being formed by container 19 and membrane 7 (see FIG. 2). Device 1 further comprises membrane holding structure 20 being fixedly connected to base 14. Furthermore, the device contains container holding structure 21, which is fixedly connected via clamp device 18 to membrane holding structure 20. As a result, container 19 is fixedly connected to base 14.

Figure 2:
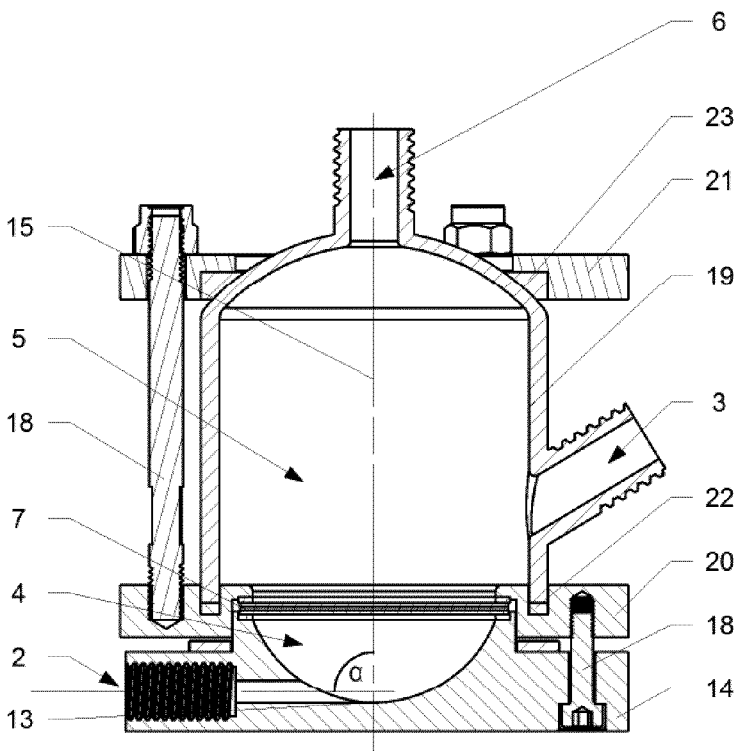
FIG. 2 a cross-sectional view of the device shown in FIG. 1.

FIG. 2 shows a cross-sectional view of device 1. Device 1 comprises base 14 with first inlet 2 for supplying a first phase. Inlet 2 opens into first chamber 4, which is partially formed by base 14. Device 1 further contains container 19 with second inlet 3 for supplying a second phase and dispersion outlet 6 for collecting the dispersion of the first phase in the second phase. Second inlet 30pens into second chamber 5, which is partially formed by container 19. The first chamber and the second chamber are being separated by membrane 7. As can be readily seen from FIG. 2, the first chamber has a rounded cross-section with respect to the corresponding cross-sectional plane along the central longitudinal axis 15 and being perpendicular to membrane 7. In the particular embodiment shown, first chamber 4 has a semi-circular cross-section and may thus have the shape of a hemisphere. First inlet 2 is arranged in the region of pole 13 of the hemisphere. Second chamber 5 is tapered towards dispersion outlet 6, which is arranged on longitudinal axis 15 extending along the longitudinal direction of the device, intersecting the center of the first and second chamber, being perpendicular to membrane 7 and intersecting the center of the membrane. As can be seen, longitudinal axis 15 constitutes a central axis of the device in the longitudinal direction. In the embodiment shown, the second chamber is arch-shaped towards dispersion outlet 6. Thus, second chamber 6 has a U-shaped cross-section. First inlet 2 is arranged in an angle α of essentially 90° with respect to central axis 15 and the channels of the membrane, which are in general parallel to axis 15. Device 1 comprises membrane holder 20 and container holder 21, which are fixedly connected with each other via releasable clamp device 18. Membrane 7 is mounted to membrane holder 20 by clamping the membrane between membrane holder 7 and base 14. Membrane holder 20 is fixedly connected to base 14 via clamp device 18. For safely securing glass container 19 between membrane holder 20 and container holder 21, pad 23, which in the particular case is a foam pad, can be arranged between container 19 and container holder 21. Membrane holder 20 comprises groove 22, for receiving container 19.

Figure 3:
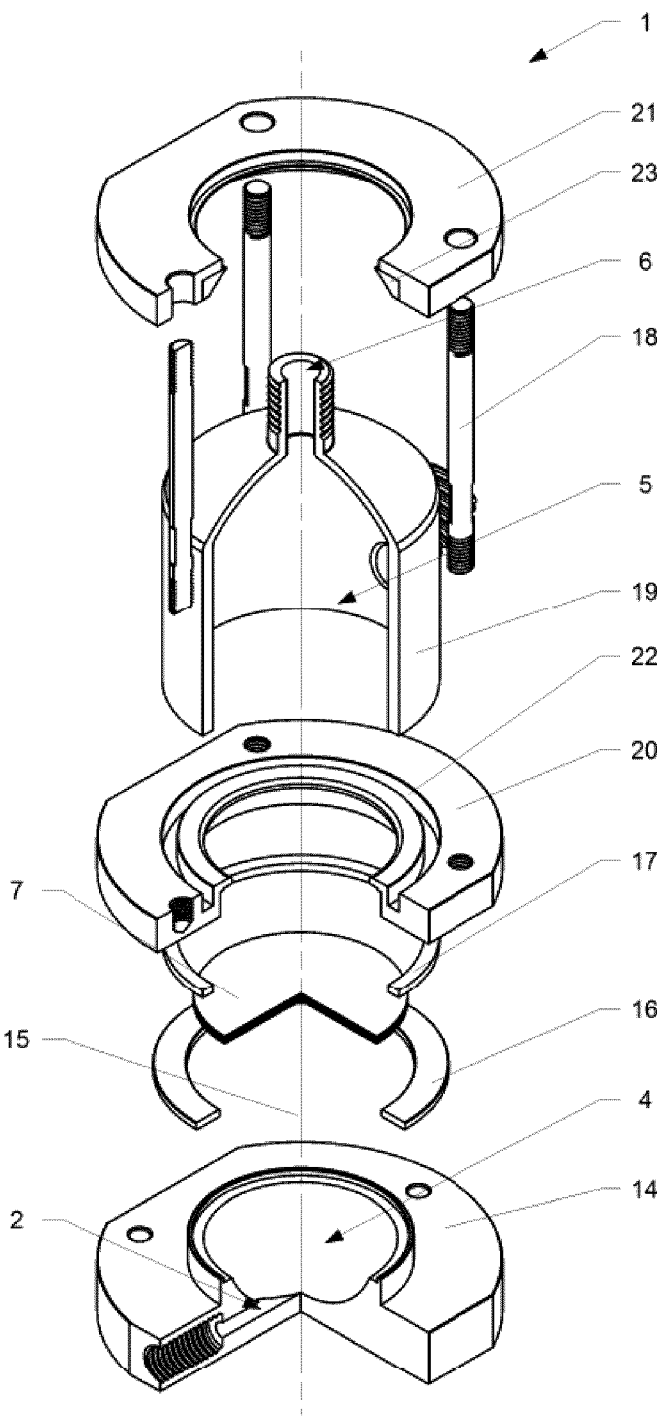
FIG. 3 an exploded partially cut-out view of the device shown in FIG. 1.

FIG. 3 shows an exploded view of partially cut device 1. As can be seen, the first chamber is partially formed by base 14 and has the shape of a hemisphere. First inlet 2, which is arranged in an angle of essentially 90° to central axis 15, is arranged on the pole of the hemisphere. Base 14 comprises spacer ring 16 which enables the use of different membranes with different thicknesses and membrane holder 20 comprises sealing ring 17. Membrane 7 is arranged between rings 16 and 17. The design of device 1 with adjustable clamp device 18 allows to employ membranes of various thicknesses. Membrane holder 20 further comprises circumferential groove 22 for receiving the lower end portion of container 19. Clamp device 18 fixedly and releasably connect membrane holder 20 with container holder 21.

Figure 4:
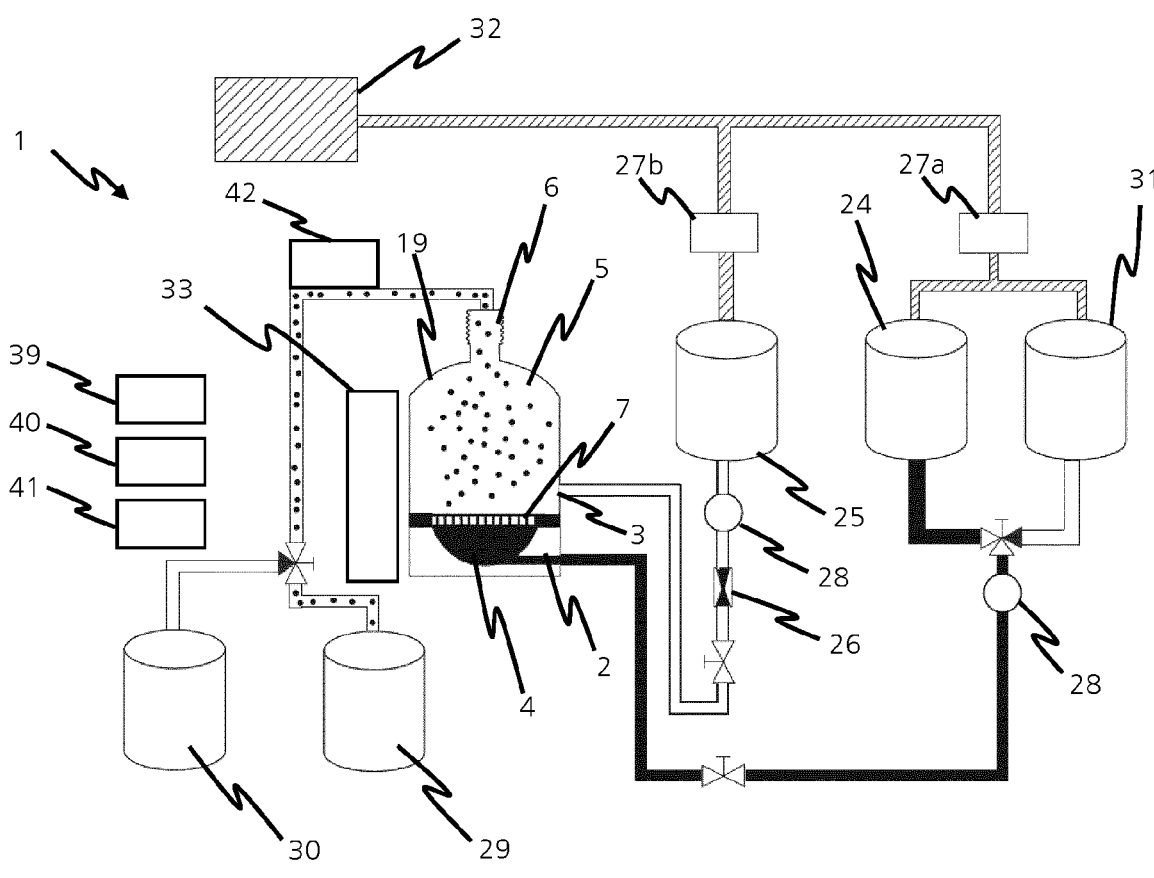
FIG. 4 a schematic view of a device 1' according to another embodiment of the invention.

FIG. 4 shows a schematic view of a device 1 according to a preferred embodiment of the invention. Second chamber 5 is formed by container 19 and membrane 7 which separates first chamber 4 from second chamber 5. Container 19 comprises dispersion outlet 6, which is in fluid connection with product vessel 29 and waste vessel 30. In general, the fluid flow may be controlled by a valve, such as a three-way valve. Device 1 further comprises first reservoir 24 which is in fluid communication with first chamber 4 for providing a first phase into first chamber 4 via first inlet 2. Arranged between first reservoir 24 and first inlet 2 is a flow meter for measuring the fluid flow of the first phase. First reservoir 24 is in fluid connection with pressure source 32. Furthermore, pressure regulator 27a is arranged between first reservoir 24 and pressure source 32. In addition to first reservoir 24, device 1 comprises rinsing reservoir 31 which is also in fluid communication with both first chamber 4 and pressure source 32. Rinsing reservoir 31 is configured for providing a rinsing solution into first chamber 4 for cleaning device 1 after its intended use.

In general, if a rinsing solution is provided to first chamber 4, the three-way valve arranged between product and waste vessel 29 and 30 and dispersion outlet 6 is configured such that the rinsing solution can flow into waste vessel 30. Device 1 further comprises heater 33 configured for heating the first and second chamber during the production of a dispersed phase. Furthermore, second chamber 5 is in fluid communication with second reservoir 25 for supplying second chamber 5 with the second phase. Flow restrictor 26 and flow meter 28 are arranged between second chamber 5 and second reservoir 25. In the embodiment shown, flow restrictor 26 is arranged behind flow meter 28 in the direction of flow. Second reservoir 25 is further in fluidic connection with pressure source 32. Additionally, a second pressure regulator 27b is arranged between second reservoir 25 and pressure regulator 27a. In a representative experiment, the first reservoir was pressurized with an overpressure of 0.08 atm and the second reservoir with an overpressure of 0.4 atm. A 1 L product vessel could be filled with the generated dispersion of the first phase in the second phase within only 12 min. Device 1 further comprises a read-out unit 39 configured for retrieving data from a tag of membrane 7 and a control unit 40 configured for processing the data from the tag. In general, the read-out unit may be arranged at any suitable position. For example, the user may scan the tag of the membrane before placing the membrane between the first chamber and the second chamber. Alternatively, the read-put unit and the tag may in general be arranged such that it can directly read out the tag when the membrane is positioned between the first chamber 4 and the second chamber 5. Device 1 additionally contains transmitter unit 41 configured for transmitting data to a receiver. In general, transmitter unit 41, control unit 40 and read-out unit 39 may be functionally connected. Device 1 also contains analysis unit 42 with a sensor for determining and controlling quality values, in particular the size and size distribution of the generated monodisperse droplets. Analysis unit 42 is positioned downstream of membrane 7, in this case downstream of dispersion outlet 6.

Figure 5:
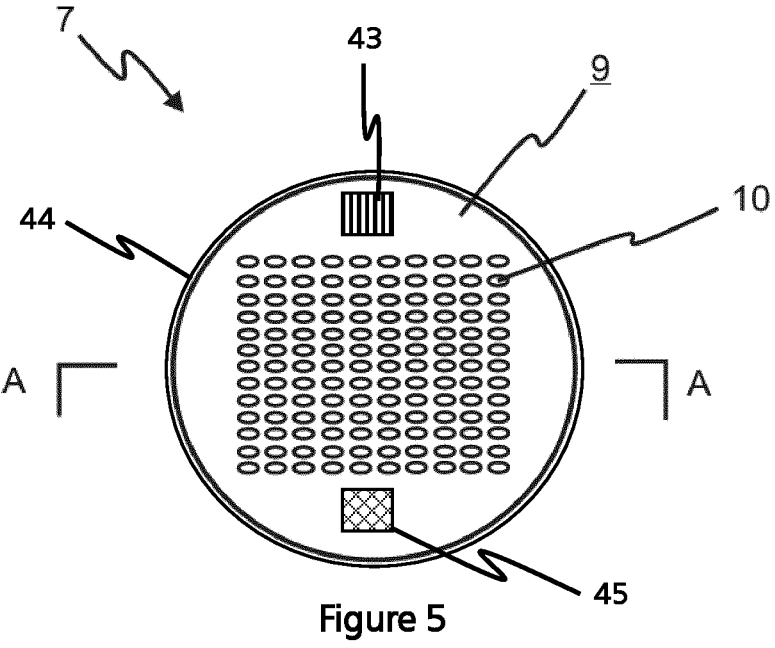
FIG. 5 a schematic enlarged view of a second side of a membrane according to a first embodiment of the invention.

FIG. 5 shows a monolayer membrane 7 for generating a dispersion of a first phase in a second phase, which can be used in a device as described in any of the embodiments disclosed herein. Membrane 7 has a first side 8 (not shown) and second side 9, which in an operative state faces a second chamber. Multiple microchannels extend through membrane 7. Each channel 10 has an elliptical contour. Membrane 7 further has a computer readable tag 43 attached to the second side 9. In addition, membrane 7 comprises membrane sealing ring 44, which circumferentially fully surrounds the periphery of the membrane. Membrane 7 can in some cases additionally comprise membrane storage unit 45 configured to receive and store data transmitted by a transmitter device.

Figure 6:
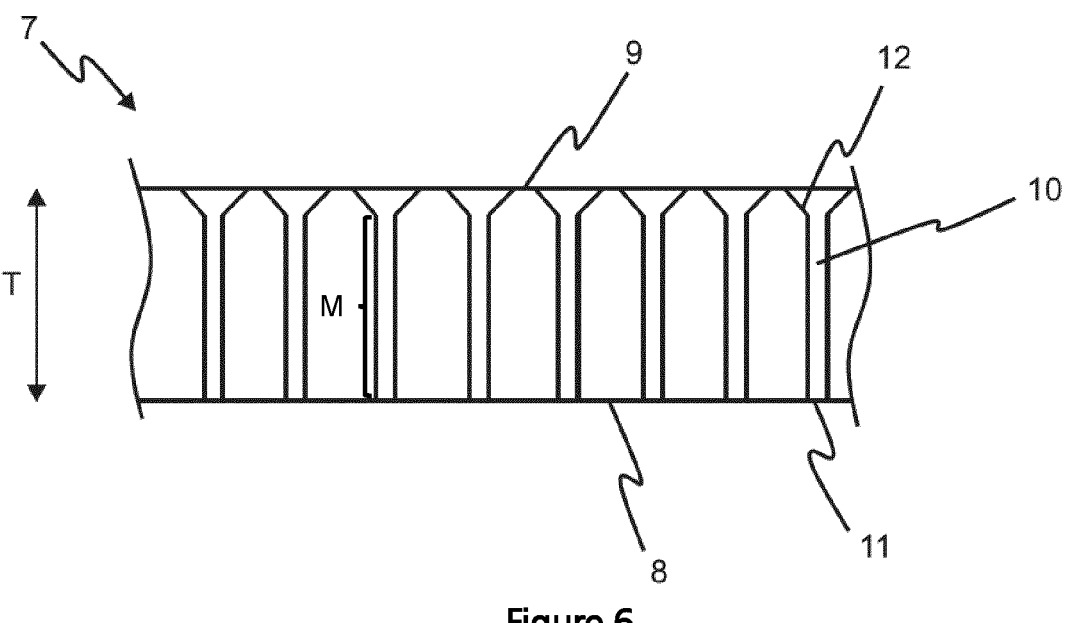
FIG. 6 a partial cross-sectional view of the membrane shown in FIG. 5 along axis A-A.

FIG. 6 shows monolayer membrane 7 with thickness T of FIG. 5 in a cross-sectional view along A-A. The membrane comprises first side 8 and second side 9. Multiple channels 10 (drawn in exaggerated dimensions) each extend from first side 8 of the membrane to second side 9 of the membrane. Each channel comprises a channel inlet ii arranged at first side 8 and channel outlet 12 arranged at second side 9. Arranged between each channel inlet and channel outlet is main section M. As can be readily seen, second side 9 comprises a total open area that is larger than the total open area of first side 8. Furthermore, the shape of each channel outlet 12 is different from the shape of the rest of the channel, i.e. of main section M and channel inlet 11. The cross-sectional area of each channel outlet 12 is larger than the cross-sectional area of the rest of the corresponding channel 10. In the embodiment shown, channel outlet 12 is wedge-shaped.

Figure 7:
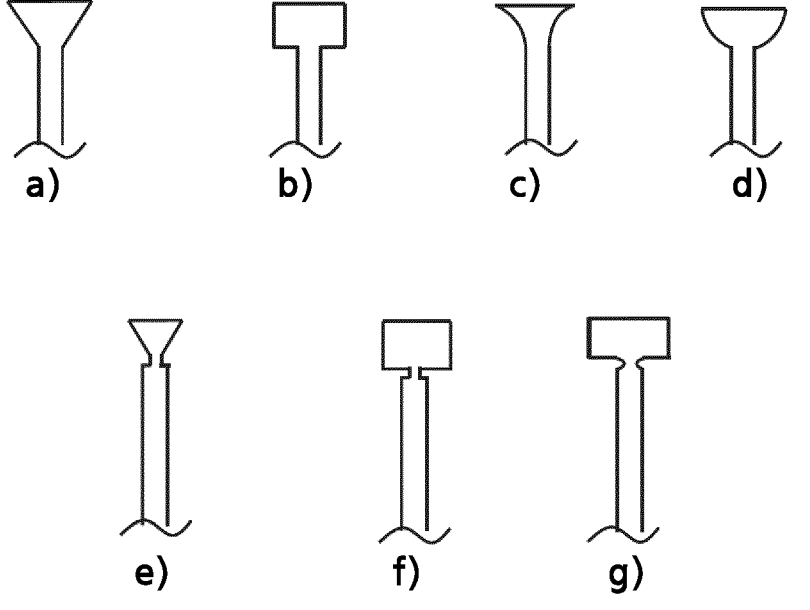
FIG. 7$a$ schematic partial representation of different channel outlet geometries according to other embodiments of the invention.

FIG. 7 shows a cross-sectional schematic partial view of a selection of channels with differently shaped channel outlets. For example, FIG. 7a) shows a wedge-shaped channel outlet. FIG. 7b) shows an angular channel outlet. FIG. 7c) and 7d) show a channel outlet in which the channel walls are convexly (FIG. 7c) or concavely (FIG. 7d) curved. FIG. 7e) to 7g) show channels with a constriction, which is arranged adjacent the channel outlet and arranged between the respective channel outlet and the rest of the channel. As can be seen, all different channels shown have a channel outlet with a larger cross-sectional area than the cross-sectional area of the rest of the channel.

Figure 8:
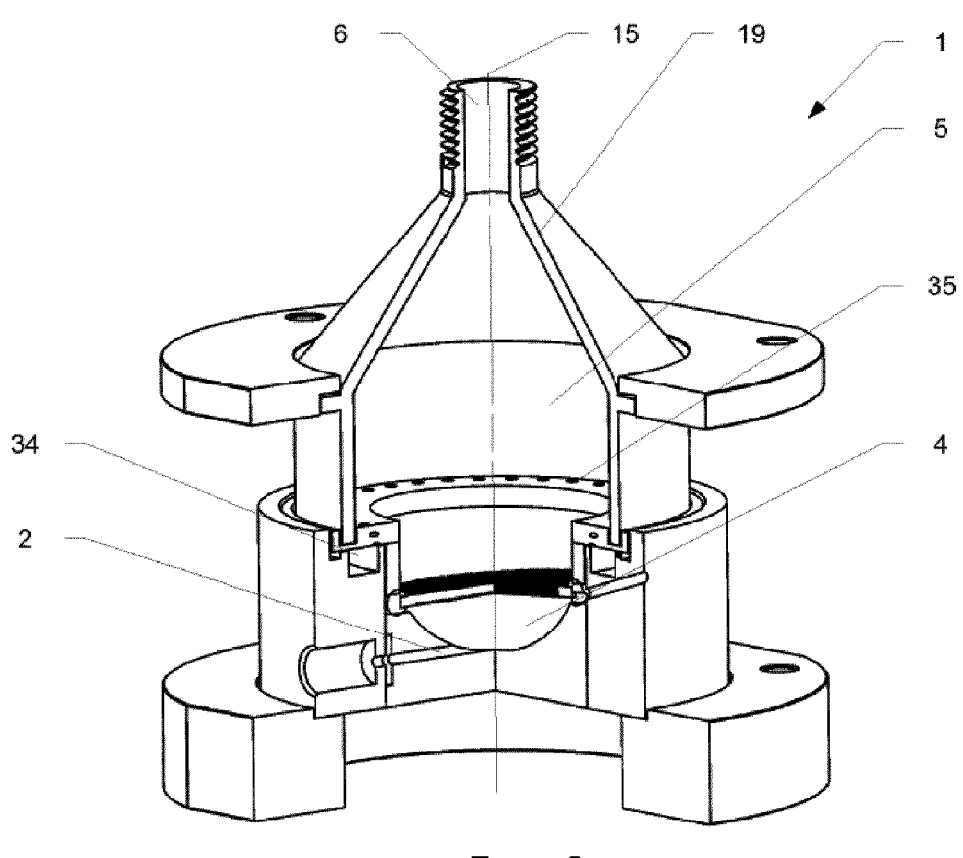
FIG. 8 a partial cross-sectional of a device according to another embodiment of the invention.

FIG. 8 shows a partial cross-sectional view of a device according to another embodiment of the invention. The device 1 has a first inlet 2 for supplying a first phase, which opens into first chamber 4 having a rounded cross-section. In the embodiment shown, first chamber 4 has the shape of a spherical dome with a radius at the base of the dome being smaller than the radius of the corresponding hypothetical full sphere. Second chamber 5 is at least partially defined by container 19. The device further comprises dispersion outlet 6 for collecting the generated dispersion of the first phase in the second phase. The corresponding membrane is not shown for better visualization. The second inlet opening towards the second chamber 5 comprises in the depicted embodiment a supply channel 34 being circumferentially arranged around central longitudinal axis 15 and/or the axis being perpendicular to the first and second side of the membrane and intersecting the center of the membrane. The supply channel 34 comprising a plurality of openings 35 into second chamber 5. Openings 35 are uniformly distributed along the circumference of the supply channel and are arranged in the direction of dispersion outlet 7. In the embodiment shown, supply channel 34 forms a ring-like structure, being arranged at the bottom of second chamber 5, i.e. at the edge of the membrane and container 19. In the embodiment shown, the supply channel has an angular cross-section. Alternatively, the supply channel may have a rounded, particularly a circular cross-section.

Figure 9:
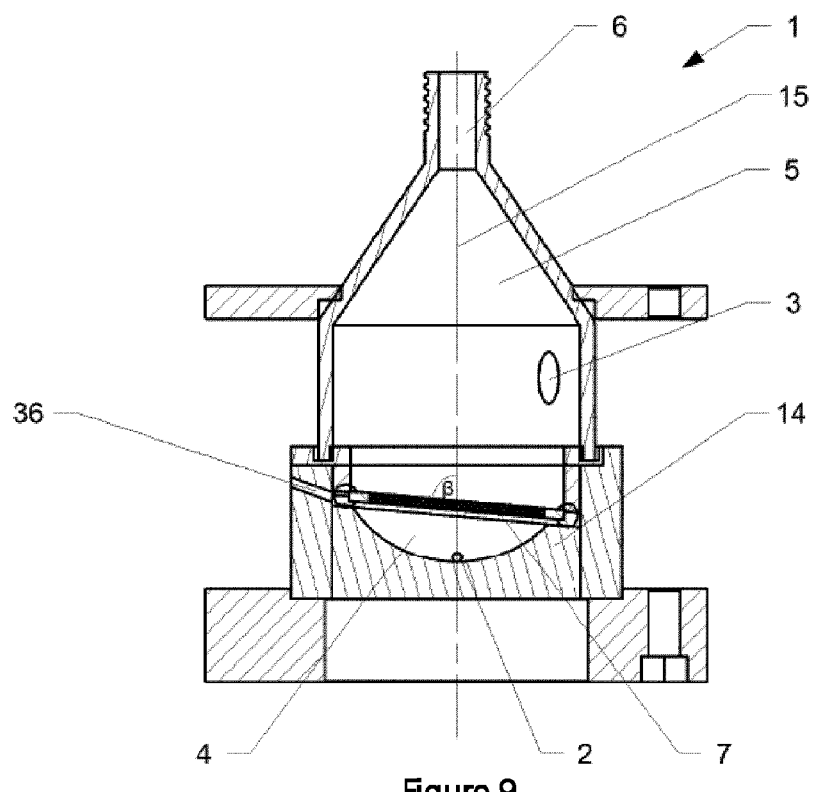
FIG. 9 a cross-sectional of a device according to another embodiment of the invention.

FIG. 9 shows a cross-sectional view of another embodiment of the device according to the invention. The device 1 has a first inlet 2 for supplying a first phase, which opens into first chamber 4 having a rounded cross-section. In the embodiment shown, first chamber 4 has the shape of a spherical dome. A membrane 7 separates first chamber 4 from second chamber 5. In contrast to the embodiment shown in FIG. 2, the membrane is inclined with respect to the central longitudinal axis 15 of the device 1. The acute angle 13 in a cross sectional view along the central longitudinal axis between the central longitudinal axis and the second side of the membrane is between 45° and 89°, preferably between 70° and 88°, more preferably between 78° and 87°. The device 1 comprises additionally gas outlet 36. The gas outlet and the membrane are arranged such that gas within the first chamber is during supplying the first phase to the first chamber, in particular during the first filling, directed towards the gas outlet and removed from first chamber 4 via the gas outlet 36. As can be seen, gas outlet 36 is arranged at the top edge of first chamber 4, which is formed by the membrane 7 and the chamber wall, which is part of the base 14. Before the initial filling of first chamber 4 with the first phase, gas, particularly air, is present in the first chamber.

Upon filling of first chamber 4 with the first phase, air is pushed out of gas outlet 36. Due to the arrangement of membrane 7 and gas outlet 36, essentially all gas can be removed from first chamber 4. As remaining gas, in particular gas bubbles have detrimental effects on pressure distribution, size and particle distribution becomes more uniform.

Figure 10:
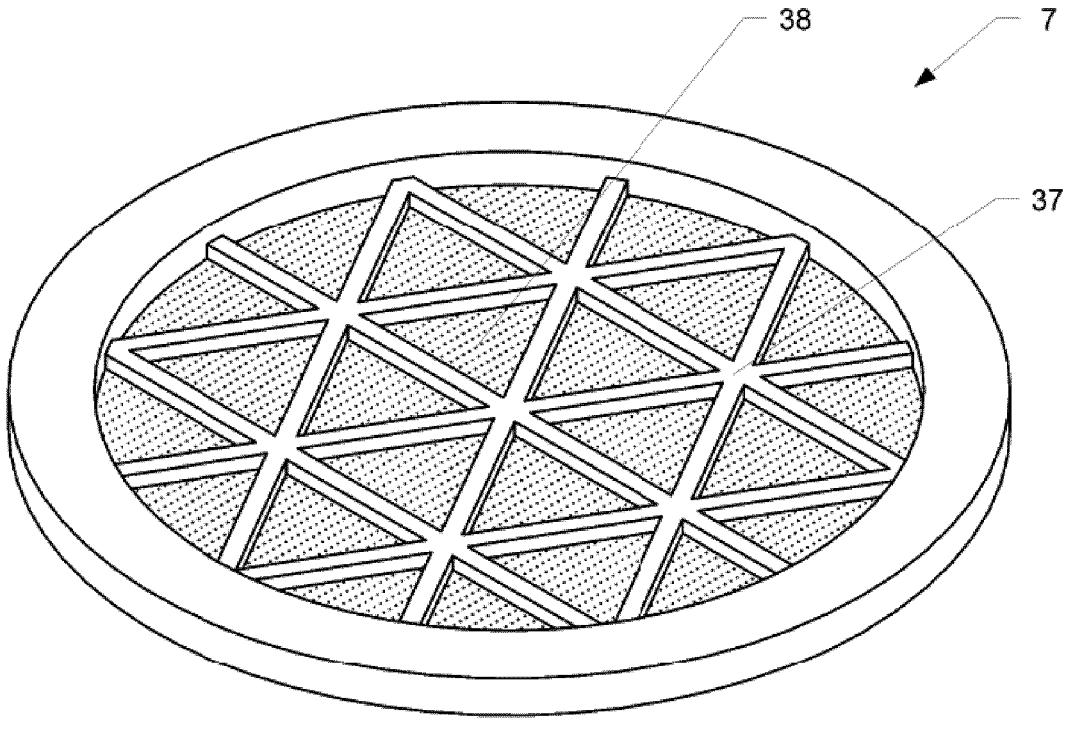
FIG. 10 a schematic view of a membrane according to another embodiment of the invention.

FIG. 10 depicts a membrane 7 according to another embodiment of the invention. Membrane 7 contains several intersecting solid support structures 37 devoid of channels, which divide the membrane in several triangularly shaped channel containing sections 38. Such a solid support structure can be integral with membrane 7 or can comprise additional elements, which are arranged on top of the first and/or second surface of the membrane.

| LIST OF REFERENCE CHARACTERS | |
|---|---|
| 1 | Device |
| 2 | First inlet |
| 3 | Second inlet |
| 4 | First chamber |
| 5 | Second chamber |
| 6 | Dispersion outlet |
| 7 | Membrane |
| 8 | First side |
| 9 | Second side |
| 10 | Channel |
| 11 | Channel inlet |
| 12 | Channel outlet |
| 13 | Pole |
| 14 | Base |
| 15 | Central axis |
| 16 | Spacer ring |
| 17 | Sealing ring |
| 18 | Clamp device |
| 19 | Container |
| 20 | Membrane holder |
| 21 | Container holder |
| 22 | Groove |
| 23 | Pad |
| 24 | First reservoir |
| 25 | Second reservoir |
| 26 | Flow restrictor |
| 27 a, b | Pressure regulators |
| 28 | Flow Meter |
| 29 | Product vessel |
| 30 | Waste vessel |
| 31 | Rinsing reservoir |
| 32 | Pressure source |
| 33 | Heater or cooler |
| 34 | Supply channel |
| 35 | Opening |
| 36 | Gas outlet |
| 37 | Solid support structure |
| 38 | Section |
| 39 | Read-out unit |
| 40 | Control unit |
| 41 | Transmitter unit |
| 42 | Analysis Unit |
| 43 | Tag |
| 44 | Membrane sealing ring |
| 45 | Membrane storage unit |
| M | Main section |

The invention claimed is:

1. A monolayer membrane comprising a first side and a second side opposite from the first side; and
multiple channels extending from the first side to the second side through the monolayer membrane, wherein each channel comprises a channel inlet arranged at a first area proximate to the first side, a channel outlet arranged at a second area proximate to the second side, and a main section arranged between the channel inlet and the channel outlet, and wherein the channel outlet comprises a funnel shape, V-shape, or U-shape, and the channel outlet comprises a cross-sectional shape deviating from a cross-sectional shape of the main section, wherein with respect to a transversal plane each channel of the monolayer membrane has a rounded-cross-section and is essentially edgeless at least within the channel and the channel outlet.

2. The monolayer membrane according to claim 1, wherein a cross-sectional area of the channel outlet-is larger than a cross-sectional area of the rest of the channel.

3. The monolayer membrane according to claim 1, further comprising at least one solid support structure without channels dividing the monolayer membrane in two or more channel-containing sections.

4. The monolayer membrane according to claim 1, wherein the monolayer membrane comprises a tag.

5. The monolayer membrane according to claim 1, wherein each channel is defined by channel walls being curved towards or within the channel outlet and/or towards the second side.

6. The monolayer membrane according to claim 1, wherein the monolayer membrane is made of glass or a polymeric material.

7. The monolayer membrane according to claim 1, wherein the monolayer membrane comprises 20 to 30,000 channels/cm$^2$.

8. The monolayer membrane according to claim 1, wherein the monolayer membrane is manufactured by additive manufacturing.

9. The monolayer membrane according to claim 1, wherein the monolayer membrane comprises 20 to 500,000 channels.

10. The monolayer membrane according to claim 1, wherein the monolayer membrane is devoid of phase interfaces or transition areas throughout the channels.

11. The monolayer membrane according to claim 1, wherein the channel outlet comprises a truncated funnel shape, a truncated cone shape, or a semi-hemispherical shape.

12. A device for generating a dispersion of a first phase in a second phase, comprising a first inlet configured to supply a first phase, the first inlet opening into a first chamber;

a second inlet configured to supply a second phase, the second inlet opening into a second chamber;

a dispersion outlet configured to collect the dispersion of the first phase in the second phase;

a monolayer membrane according to claim 1 separating the first chamber and the second chamber, the first side of the monolayer membrane facing the first chamber and the second side of the monolayer membrane facing the second chamber, wherein the multiple channels are configured to provide a fluidic connection between the first chamber and the second chamber.

13. The device according to claim 12, wherein the first chamber is configured such that the pressure along the first side of the monolayer membrane is essentially isobaric.

14. The device according to claim 12, wherein the first chamber has a rounded cross-section.

15. The device according to claim 14, wherein the first chamber has a shape selected from spherical cap, truncated cone and/or hemispherical.

16. The device according to claim 12, wherein the second side of the monolayer membrane has a total open area formed by the channels that is larger than a total open area of the first side of the monolayer membrane.

17. The device according to claim 12, wherein each channel comprises an end area at the channel outlet with a cross-sectional area which is larger than a cross-sectional area of a remaining part of the respective channel.

18. The device according to claim 12, wherein the first inlet is arranged in an angle of essentially 90° or less with respect to the channels of the monolayer membrane or the first inlet is essentially transversely arranged to the multiple channels of the monolayer membrane.

19. The device according to claim 12, further comprising a base, wherein the first chamber is partially formed by the base.

20. The device according to claim 12, wherein the first chamber comprises a gas outlet, and wherein the gas outlet and the monolayer membrane are arranged such that gas within the first chamber is directed towards the gas outlet and removed from the first chamber via the gas outlet when the first phase is supplied to the first chamber.

21. The device according to claim 12, wherein the device comprises at least one of a heater or cooler configured to heat or cool at least one of the first phase or the second phase.

22. The device according to claim 12, wherein the monolayer membrane comprises a tag, and wherein the device further comprises a read-out unit configured to retrieve data from the tag and a control unit configured to process the data from the tag.

23. The device according to claim 12, further comprising an analysis unit with a sensor configured to determine and control quality values including the size and size distribution of the generated monodisperse droplets.

24. The device according to claim 12, wherein the second inlet comprises a supply channel being at least partially circumferentially arranged around a central longitudinal axis, the axis being perpendicular to the first and second side of the monolayer membrane and intersecting the center of the monolayer membrane.

25. The device according to claim 12, wherein the first chamber is configured such that a flow rate of the first phase through each individual channel is essentially uniform.

26. A method for generating a dispersion of a first phase in a second phase using a device according to claim 12, comprising:

supplying a first phase through the first inlet into the first chamber, and supplying a second phase through the second inlet into the second chamber, wherein the first phase flows from the first chamber through the multiple channels of the monolayer membrane into the second chamber to form a dispersion of the first phase in the second phase.

27. The method according to claim 26, wherein a pressure along the first side of the monolayer membrane is essentially isobaric.

28. The method according to claim 26, wherein the mass flow through each of the individual channels is essentially equal over the monolayer membrane.

29. The method according to claim 26, further comprising retrieving data by a read-out unit from a tag on the monolayer membrane and providing the retrieved data to a control unit which processes the data.

30. The method according to claim 26, further comprising transmitting data by a transmitting unit to a receiver.

31. The method according to claim 26, further comprising processing the generated dispersion of the first phase in the second phase to generate capsules and particles, including at least one of microcapsules, micro-particles, nanocapsules, or nanoparticles.

32. A system for generating a dispersion with multiple core droplets comprising at least two devices according to claim 12 connected in series.

33. A monolayer membrane comprising a first side and a second side opposite from the first side; and multiple channels extending from the first side to the second side through the monolayer membrane, wherein each channel comprises a channel inlet arranged at a first area proximate to the first side, a channel outlet arranged at a second area proximate to the second side, and a main section arranged between the channel inlet and the channel outlet, and wherein each channel outlet comprises a cross-sectional shape deviating from a cross-sectional shape of the main section, wherein the channel outlet comprises a cross-section that gradually increases through the second area towards the second side, wherein each channel of the monolayer membrane has a rounded cross-section and is essentially edgeless at least within the channel and the channel outlet.

34. The monolayer membrane according to claim 33, wherein a cross-sectional area of the channel outlet is larger than a cross-sectional area of the rest of the channel.

35. The monolayer membrane according to claim 33, further comprising at least one solid support structure without channels dividing the monolayer membrane in two or more channel-containing sections.

36. The monolayer membrane according to claim 33, wherein the monolayer membrane comprises 20 to 500,000 channels.

37. The monolayer membrane according to claim 33, wherein the channel outlet comprises a truncated funnel shape, a truncated cone shape, or a semi-hemispherical shape.

38. A monolayer membrane comprising a first side and a second side opposite from the first side; and multiple channels extending from the first side to the second side through the monolayer membrane, wherein each channel comprises a channel inlet arranged at a first area proximate to the first side, a channel outlet arranged at a second area proximate to the second side, and a main section arranged between the channel inlet and the channel outlet, and wherein each channel outlet comprises a cross-sectional shape deviating from the shape of a cross-sectional main section, wherein with respect to a transversal plane each channel of the monolayer membrane has a rounded cross-section and is essentially edgeless at least within the channel and wherein the channel outlet has an elliptic cross-section which increases towards the second side.

39. The monolayer membrane according to claim 38, further comprising at least one solid support structure without channels dividing the monolayer membrane in two or more channel-containing sections.

40. The monolayer membrane according to claim 38, wherein the monolayer membrane comprises 20 to 500,000 channels.

41. A device for generating a dispersion of a first phase in a second phase, comprising a first inlet configured to supply a first phase, the first inlet opening into a first chamber;

a second inlet configured to supply a second phase, the second inlet opening into a second chamber;

a dispersion outlet configured to collect the dispersion of the first phase in the second phase;

a monolayer membrane according to claim 38 separating the first chamber and the second chamber, the first side of the monolayer membrane facing the first chamber and the second side of the monolayer membrane facing the second chamber, wherein the multiple channels are configured to provide a fluidic connection between the first chamber and the second chamber.

* * * * *